US007089243B1

(12) United States Patent
Zhang

(10) Patent No.: US 7,089,243 B1
(45) Date of Patent: Aug. 8, 2006

(54) METHOD AND APPARATUS FOR A PROFESSIONAL PRACTICE APPLICATION

(76) Inventor: Liping Zhang, 10171 Macadam La., Cupertino, CA (US) 95014

( * ) Notice: Subject to any disclaimer, the term of this patent is extended or adjusted under 35 U.S.C. 154(b) by 708 days.

(21) Appl. No.: 10/079,005

(22) Filed: Feb. 20, 2002

Related U.S. Application Data

(60) Provisional application No. 60/270,370, filed on Feb. 20, 2001.

(51) Int. Cl.
*G06F 17/30* (2006.01)
(52) U.S. Cl. ........................................... 707/9
(58) Field of Classification Search .................. 707/9
See application file for complete search history.

(56) References Cited

U.S. PATENT DOCUMENTS

| | | | | |
|---|---|---|---|---|
| 6,014,666 A | * | 1/2000 | Helland et al. | 707/9 |
| 6,161,139 A | * | 12/2000 | Win et al. | 709/225 |
| 6,163,878 A | | 12/2000 | Kohl | 717/1 |
| 6,202,066 B1 | * | 3/2001 | Barkley et al. | 707/9 |
| 6,453,353 B1 | * | 9/2002 | Win et al. | 709/229 |
| 6,732,100 B1 | * | 5/2004 | Brodersen et al. | 707/9 |

* cited by examiner

*Primary Examiner*—Tim Vo
*Assistant Examiner*—Haythim Alaubaidi
(74) *Attorney, Agent, or Firm*—Liping Zhang

(57) ABSTRACT

The current invention provides method and apparatus for managing a professional practice application over the Internet or other wide area network (WAN) or local area network (LAN). The application includes a range of integrated features: for tracking clients/customers/patients and their matters/cases/histories; for time keeping and billing; for docketing/calendaring of key events; and for accounting. The application is accessible to individual or group users, with each group able to customize the application views that are presented to each user of a group depending on the role assigned to each individual user by a manager within each group.

10 Claims, 8 Drawing Sheets

METHOD AND APPARATUS FOR A PROFESSIONAL PRACTICE APPLICATION

CROSS REFERENCE TO RELATED APPLICATION

This application claims the benefit of prior filed co-pending Provisional Application No. 60/270,370 filed on Feb. 20, 2001 entitled "METHOD AND APPARATUS FOR A PROFESSIONAL PRACTICE APPLICATION" which is incorporated herein by reference in its entirety as if fully set forth herein.

COPYRIGHT NOTICE

A portion of the disclosure of this patent application contains material which is subject to copyright protection. The copyright owner has no objection to the facsimile reproduction by anyone of the patent document or patent disclosure as it appears in the Patent and Trademark Office patent files or records, but otherwise reserves all copyright rights whatsoever.

BACKGROUND OF THE INVENTION

1. Field of Invention

This invention relates generally to a web application for a professional practice and more particularly, to methods and apparatus for managing application usage.

2. Description of the Related Art

Service professionals such as: accountants, doctors, entertainers, lawyers, consultants, brokers, architects, etc. require professional practice applications to help organize their business. Traditionally these software applications are sold in modular form on a stand alone or networked basis. A professional might buy a first application for tracking clients/customers/patients and their matters/cases/histories. Another application would handle time keeping. Still another application would handle calendaring or docketing of key events. Other applications would handle accounting functions such as: accounts receivable, accounts payable, payroll, general ledger and journal.

Traditionally, the use of each module, e.g. case management, time keeping, docketing, accounting, was limited to selected members of the firm or service business depending on their role in the organization. Thus, the bookkeeper for a given service profession would be the only within the organization with access to the accounting software application. Attorneys, or doctors for example would be given access to the time-keeping application, but not their staff. A docket clerk would be in control of a docketing/calendaring application and so forth. As employees of each service business are hired they are given access to the appropriate application(s) by means of loading the application on their computer, with or without a password. When an employee leaves a service business they no longer have access to the computer on which their application was loaded.

Recently, several of the above named applications, e.g. time keeping and billing have been offered on the Internet. Typically these are offered to single users on a subscription basis. While such offerings may be of use to sole practitioners, they do not meet the needs of larger service profession businesses because they are not set up for service professionals operating in a group.

What is needed is a professional service application suitable for use over the Internet by individual service professionals or service professionals operating in groups.

SUMMARY OF THE INVENTION

The current invention provides method and apparatus for managing a professional practice application over the Internet or other wide area network (WAN) or local area network (LAN). The application includes a range of integrated features: for tracking clients/customers/patients and their matters/cases/histories; for time keeping and billing; for docketing/calendaring of key events; and for accounting. The application is accessible to individual or group users, with each group able to customize the application views that are presented to each user of a group depending on the role assigned to each individual user by a manager within each group.

In an embodiment of the invention a professional practice application configured for use over a network by users operating professionally as individuals or as one or more groups is provided. The application includes: a database, web pages, and an access controller. The database includes portions for selectively receiving and supplying data related to a professional practice. The web pages include a set of web pages for viewing and entering data related to professional practice into said database, and at least one managerial web page for entering of access roles for each user. The access controller controls access by each user to selected ones of both said web pages and said plurality of portions of said database with access roles which match the access role of the user. The access controller supplies the at least one managerial web page to each user with an access role of manager to vary access privileges to the professional practice application for other users within the corresponding manager's group.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

Figure 1:
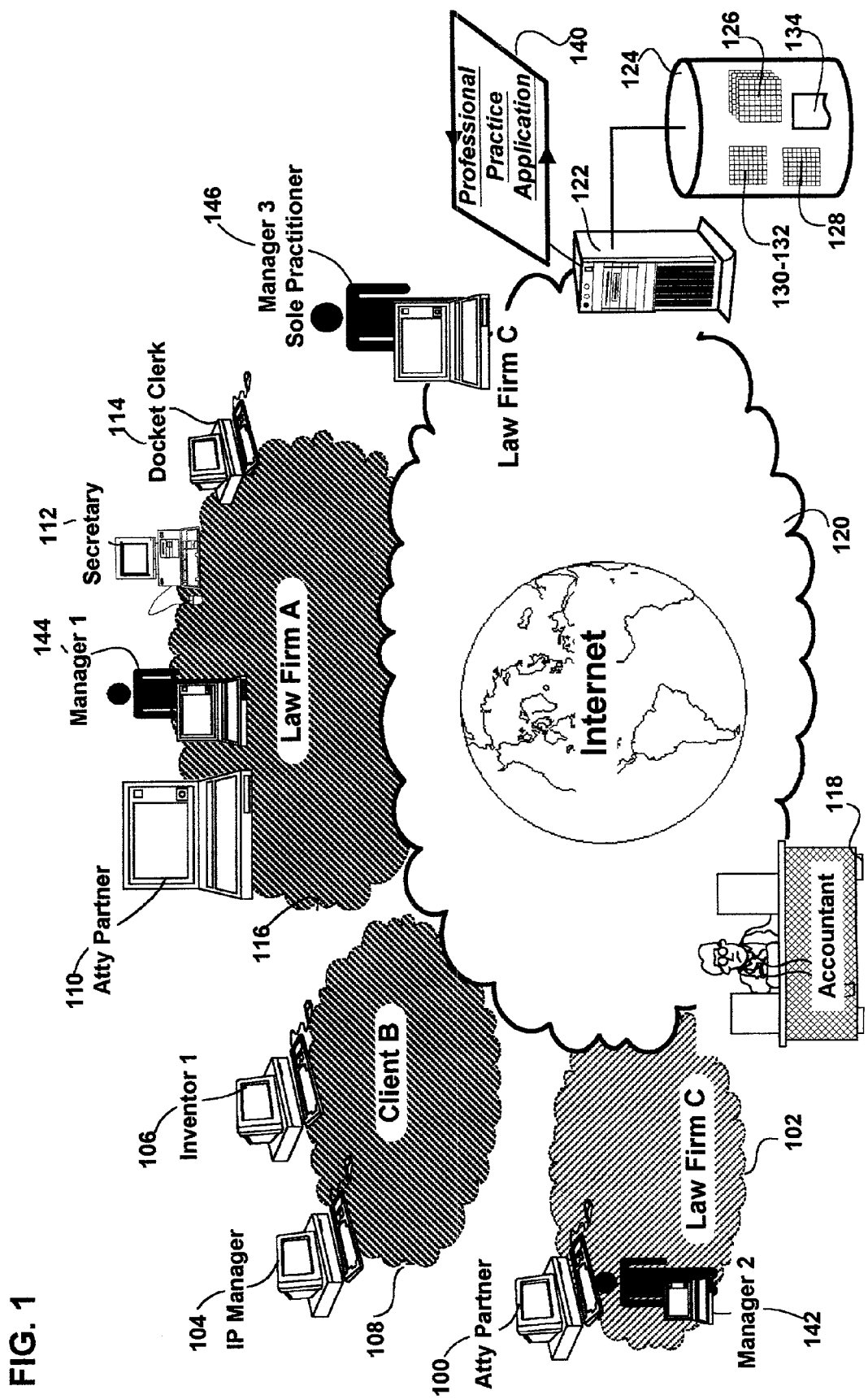
FIG. 1 is an overall system diagram of an individual and group users connected over the Internet to a professional practice application

FIG. 1 is an overall system diagram of an individual and group users connected over the Internet to a professional practice application. The application includes a range of integrated features: for tracking clients/customers/patients and their matters/cases/histories; for time keeping and billing; for docketing/calendaring of key events; and for accounting. The application is accessible to individual or group users, with each group able to customize the application views that are presented to each user of a group depending on the role assigned to each individual user by a manager within each group.

In FIG. 1 three groups are shown connected over the Internet 120 to the web site from which the professional practice application 140 is delivered. The first "group" is a sole practitioner 146 who operates her own law firm. She is given the role of manager and is thus able to use all features of the application and in addition to add other users to her firm as it grows. The second group is law firm "A", its client "B" and their accountant 118. The law firm "A" includes docket clerk 114, secretary 112, manager 144 and attorney partner 110. These users are all coupled to one another via local area network (LAN) 116 and through the LAN via the Internet 120 to the server 122. Their client "B" includes an inventor 106 and an intellectual property (IP) manager 104, coupled to one another via LAN 108, which in turn couples to the Internet 120. Within this second group, the user with a managerial role, i.e. manager 144, of the law firm controls the professional application views which are presented to employees within the firm as well as the other users defined as part of the group who are not part of the firm, e.g. the client "B" and the accountant 118. The third group is law firm "C" and their accountant 118. Law firm "C" includes employee members: attorney/partner 100 and a user 142 with the role of manager. The members of this firm are coupled to one another via LAN 102, and via the Internet to the accountant 118 and the web application 140.

Each of these users accesses the professional practice application 140 over the Internet 120 or other wide area network (WAN) or local area network (LAN). The application is provided on server 122 and associated storage device 124. The storage device includes various web pages 134 and data tables 126 associated with the application. A registration table 128 is part of the application and allows the user within each group to set up new users and allocate roles to users over the Internet. Access tables 130–132 correlate each web page 134 and data table 126 with a specific user role.

Figure 2:
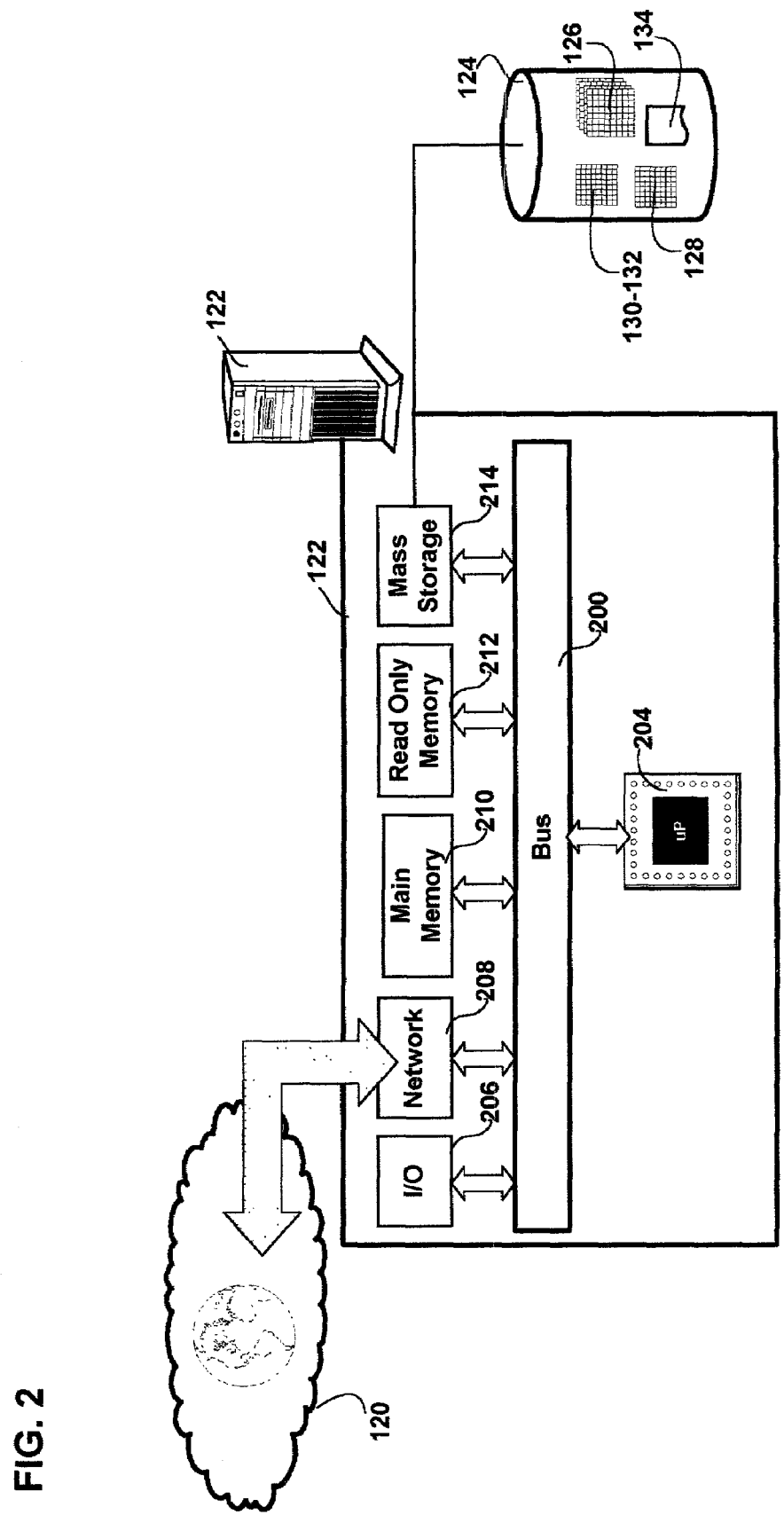
FIG. 2 is a hardware block diagram of a computer suitable for delivering the professional practice management application shown in FIG. 1.

FIG. 2 is a hardware block diagram of a computer suitable for delivering the professional practice management application shown in FIG. 1. The server 122 includes at least one processor 204 for processing information. The processor couples via a bus 200 with Input/Output (I/O) devices 206, network device 208, main and read only memories 210–212 and mass storage device 214. The I/O device 206 may include keyboard and display. The network device 208, wired or wireless, couples the server with the Internet 120, or other wide area network (WAN) or local area network (LAN). The main memory 210 stores information and instructions for the processor. The read only memory 212 stores static information and boot instructions for the server. The mass storage device 214, such as magnetic disk and associated disk drive, couples with the bus 200 for storing information and instructions on the storage medium 124.

Figure 3A:
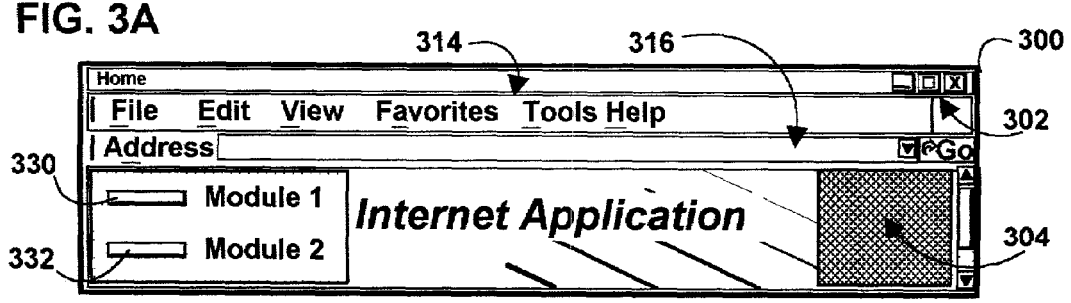
FIGS. 3A–D show various graphical user interfaces for signup and management of the practice management application by each individual user and/or group of users.

FIGS. 3A–D show various graphical user interfaces for signup and management of the practice management application by each individual user and/or group of users. FIG. 3A shows a browser interface 300 in which the home page 304 of the application is shown. The browser interface includes a menu bar 314, an address bar 316, window management icons 302 and the display area in which the home page 304 is displayed. The home page 304 includes user interfaces 330 and 332 for selecting a feature of the application.

Figure 3B:
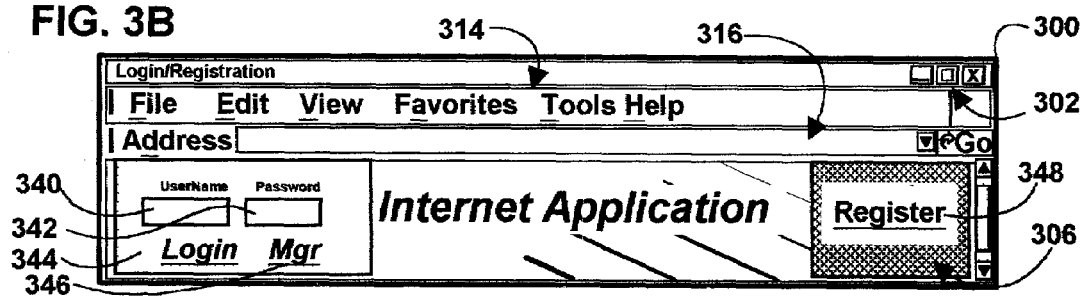

FIG. 3B shows a user registration window 306. In an embodiment of the invention the user is directed to this window upon selection of either of the features on the home page if they have not logged in. The user registration window includes fields for user name and password 340 and 342 respectively. After entry of user name and password a user may login with user icon 344 and begin viewing the application. Alternately, where the user has a role of manager they may select user icon 346 to log in as manager in which event they will be presented with a user interface such as that shown in FIG. 3D. Where the user is not yet registered they will select registration icon 348 and will be presented with the user interface shown in FIG. 3C.

Figure 3C:
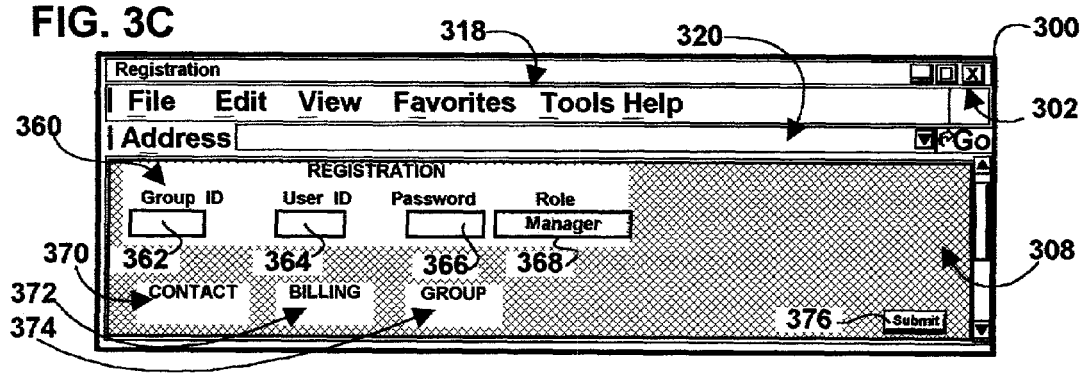

FIG. 3C shows the registration page 308. That page includes fields for recording group identifier 362, user ID 364, password 366 and role 368. All new users not registered by a manager as part of an existing group will be automatically given the role of manager as shown in FIG. 368. This role allows them full access to the application in general and to the manager interface shown in FIG. 3D. This latter interface allows them to add or remove users from their group and to allocate roles to the user. Additional fields 370–374 are provided for contact, billing and group information respectively. A user icon 376 is provided for submitting the entered data.

Figure 3D:
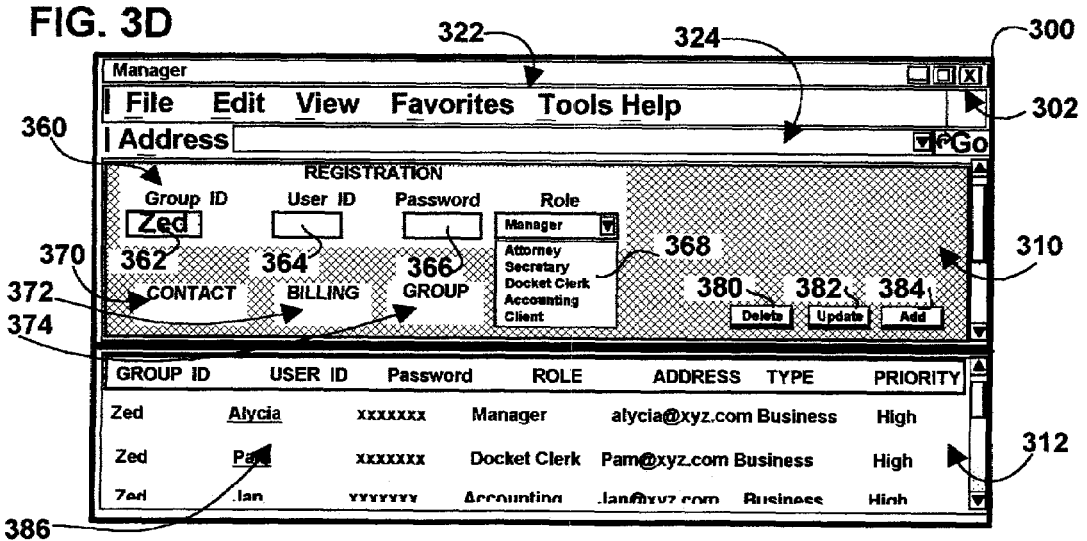

FIG. 3D shows the browser with the managerial interface. That interface is a frame with an upper form portion 310 for adding new users, for viewing existing users, and for updating/deleting users of the group. The upper form includes fields for group ID 362, user ID 364, password 366 and role 368. Since a managerial role only exists for users with established groups the group ID is a read only field and can not be altered. Roles are selected from a drop down list 368 or other suitable interface. In the example shown roles include manager, attorney, secretary, docket clerk, accounting, and client. As will be described in greater detail in the following drawings these roles and the operation of the application responsive to the selection thereof govern the viewing and use of the application for each associated user. Additional fields 370–374 for entering contact, billing, and group information respectively may also be provided. Icons 380–384 for respectively: deleting, updating, and adding a user to a group are shown. Processes discussed in greater detail in the following FIG. 6 assure that at least one individual in each group retains the role of manager thus assuring that the managerial interface and the capabilities it provides will remain available for the group.

Figure 4:
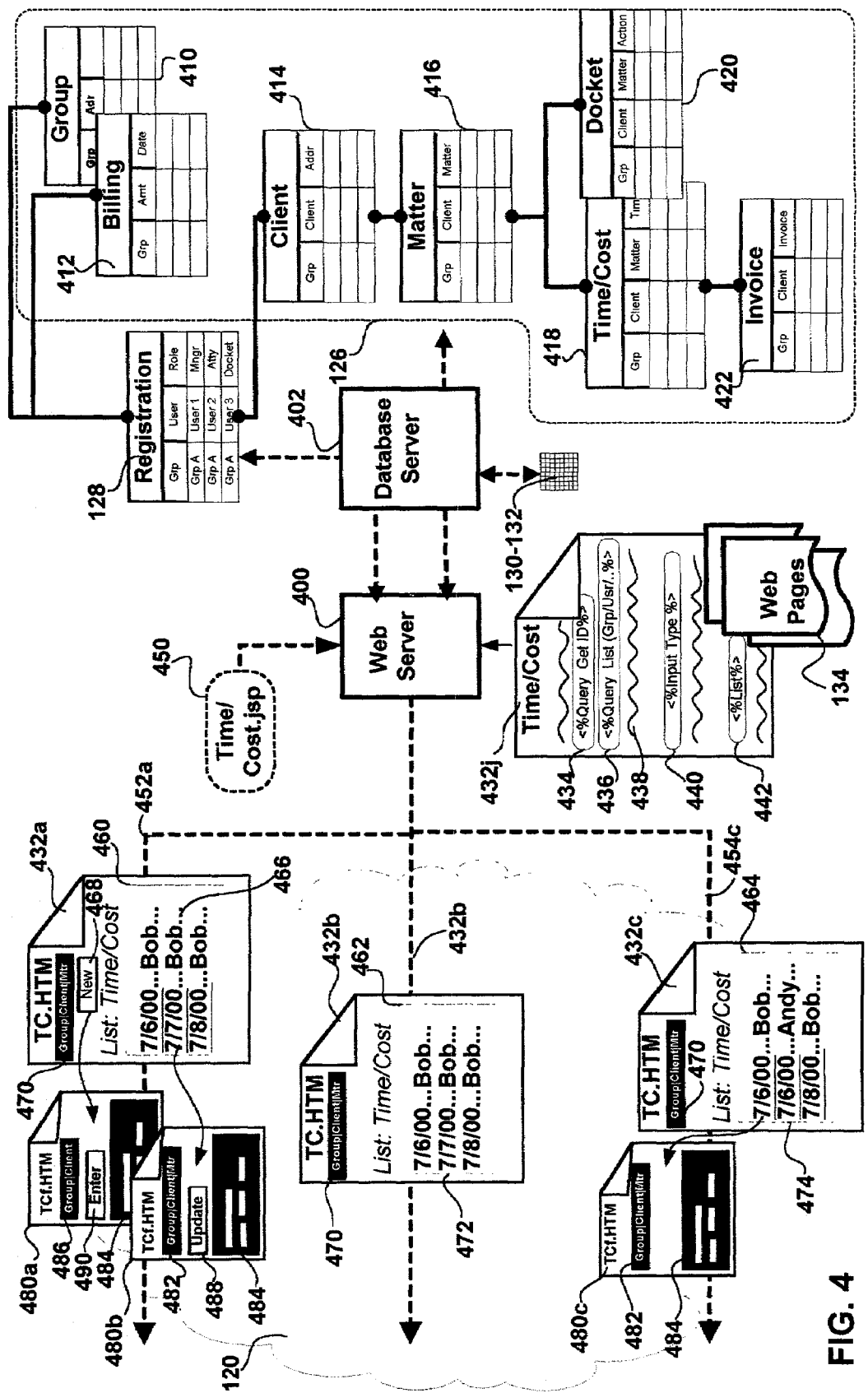
FIG. 4 shows system level data structures associated with the delivery of the practice management application to various users within each group.

FIG. 4 shows system level data structures associated with the delivery of the practice management application to various users within each group. The application data tables 126, registration tables 128, access tables 130–132, web pages 134 are shown as accessed by the combined web server 400 and database server 402. These latter software modules are part of the server 122 (See FIG. 1). The web server such as Jrun® by Allaire Corporation and the database engine such as Oracle 8i® by Oracle Corporation handle the Internet communication together with application logic and the database I/O respectively for the professional practice application. The application tables 126 include billing table 412, group table 410, client table 414, matter table 416, time/cost table 418, docket/action table 420 and invoice table 422. These tables are configured as a relational database. Other database formats, i.e. flat file, and object based may also be used in the practice of the invention. The registration table 128 contains the group identifiers and within each group the user names, passwords and roles. The access tables contain for each web page and each table the associated role(s) with which the table or page correlates.

Web pages 134 define the application interface(s) for the users to the application. Selected ones of the pages are dynamically configurable depending on the associated role of the user viewing the page. These pages, e.g. " . . . jsp" pages are assembled by the web server on the basis of the role of the requesting user. The role of the requesting user is determined during session setup using the user ID and password and the corresponding role of the user as maintained in the registration table 128. The web server controls presentment of the page and of dynamically interpreted elements within a page based on the role of the user. In the example shown the user has requested 450 a time/cost.jsp page 432*j* from the home page 304 (See FIG. 3A) or other page in the application. The requested page has one or more roles associated with it which are stored in the page access table 130. Assuming the users role correlates with the role(s) in the page access table the page is assembled for presentment to the user. The form in which the page is presented will vary between users where as here there are dynamically interpreted elements within the page. In the example shown the .jsp page 432*j* will be assembled into at least three distinctive TC.HTM pages in a markup language depending on the role of the user and the role(s) associated with each dynamic element within the page. In the example shown the jsp page includes a static portion 438 in hypertext (HTML) or other markup language (HTML) as well as dynamic portions. Dynamic portions 434, 436, 440 and 442 are shown. Dynamic portion 434 is a string which invokes the web server to determine the role of the requesting user. Dynamic portions 436, 442 are a database query and listing of query results to one or more of the database tables 126, the results of which vary depending on the role of the requesting user. Dynamic portion 440 conditions the assembly by the web server of a user interface such as a button, input box, text field, etc. on the role of the user.

Three separate assembly paths 452*abc* brought about by the dynamic elements within the page result in the display of three distinct pages 432*a*, 432*b*, 432*c*. Page 432*b* is assembled by the web server 400 in response to a request from a user with a role of secretary for the time/cost.jsp page. That page 432*b* includes a list 462 with individual records displayed, e.g. record 472. In the example shown this is a time/cost list for the attorney with whom the secretary is showing the attorney's time entries for the particular matter recorded in the link fields 470. The page contains no active elements, e.g. buttons, or uniform resource locators (URLs).

Page 432*c* is assembled by the web server 400 in response to a request from a user with a role of accountant for the time/cost.jsp page. That page 432*c* includes a list 464 with individual records displayed, e.g. record 472. The records in this list include time/cost records, e.g. record 474, for all attorneys who billed on the associated matter shown in link fields 470. The nature and scope of the query may be determined by the role of the requesting user. Additionally, each record has an associated URL represented by the underlining of all or a portion of the record. This active link, is injected to the *.HTM page 432*c* during its assembly from the associated jsp page 432*j* by the web server based on the role of the user requesting the page. The selection of the active link results in another page request to the web server for a related time-cost-form.jsp page (not shown). The web server processes the request in the manner discussed above, checking the role of the page vs. the role of the user in the registration table, and assembling any dynamic elements also to accord with the user. The assembled time-cost-form.htm page 480*c* is shown with link fields 482 and form 484 which displays the details of the selected record. No editing or updating icon elements are available to the user with role of accountant.

The third of the assembled TC.htm pages 432*a* contains all the features of the page assembled for the accountant plus an active element 468 for entering a new time/cost entry. The page includes a list 460 with individual records, e.g. record 466, each of which includes an URL represented by the underline portion of the record. The individual records are limited to the attorney user, and do not include other attorneys billing on the related matter, as were presented to the accountant on page 432*c* discussed above. Thus the query elements 436 and 442 of the associated jsp page 432*j* themselves result in a variation of the query to the database by the web and database servers 400–402, depending on the role of the requesting user. Additionally, an active element is assembled into the page. The active element in the page is the "new" button 468 which is assembled by the web server from input type element 440 within the time-cost .jsp page 432*j*, in response to a determination that the requesting user has a role of attorney in the registration table. The selection of the new button 468 results in the display of time-cost input form.htm page 480*a* from the related time-cost-form.jsp page discussed above. That form as assembled for the attorney includes: form 484, active links 486 and a submit/enter icon 490 which allows the user to add their new time or cost entry to the database. Where the attorney selected an URL on an existing entry in the list a similar form 480*b* is generated by the web server from the same time-cost input form.jsp page discussed above (not shown). This time the form includes an update button 488 to allow the attorney to update the time or cost record in the database.

Figure 5A:
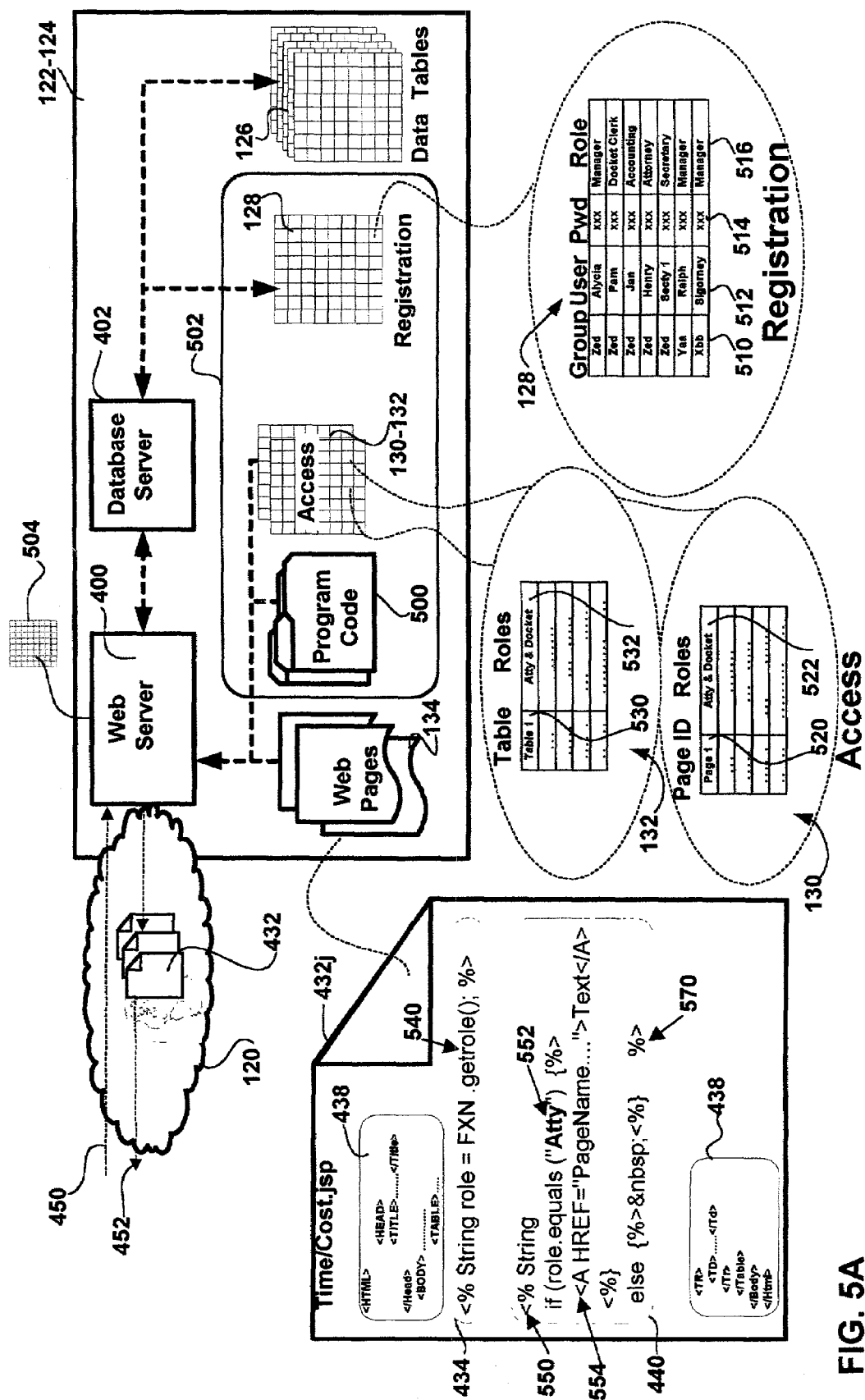
FIGS. 5A–C show various embodiments of software modules and management tables for the professional practice application of the current invention.
Figure 5B:
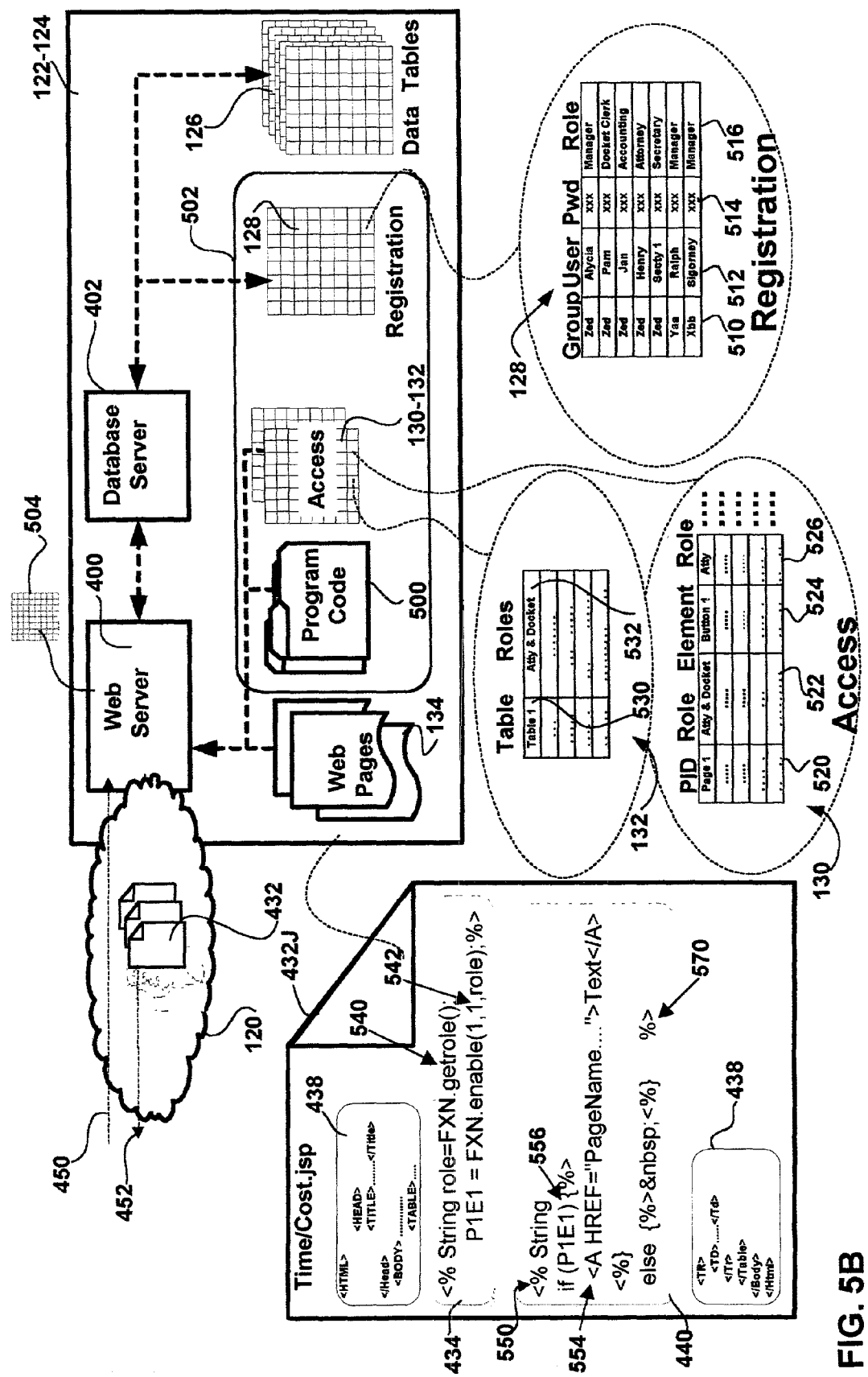
Figure 5C:
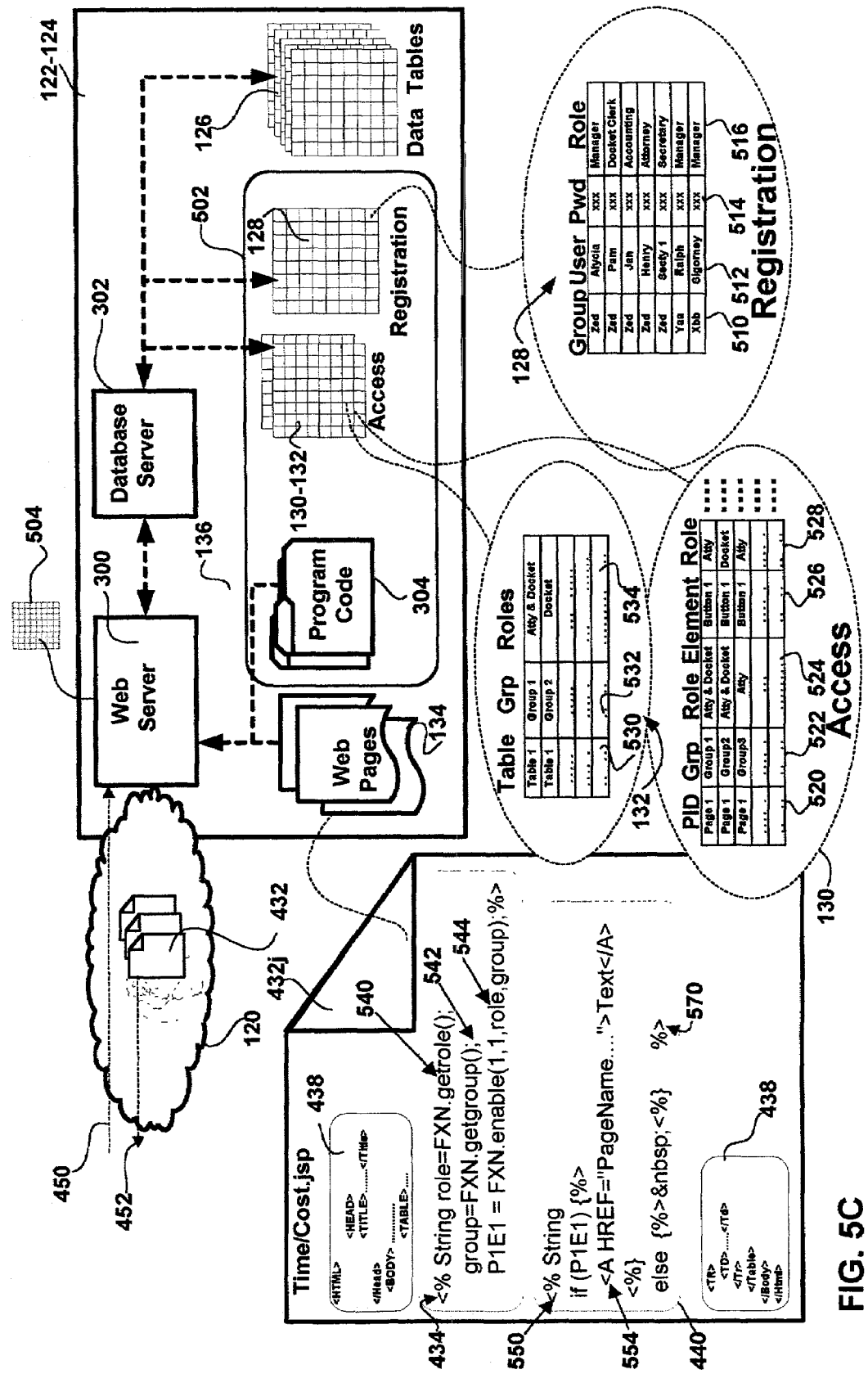

FIGS. 5A–C show various embodiments of software modules and management tables for the professional practice application of the current invention. The application server 122 and storage 124 are shown to contain a web server 400 and a database server 402. The Web server couples via the Internet 120 to the various users. The users make a request 450 and receive one or more responses 452 depending on the role of the user as recorded in the registration table 128. The Web server generally handles communications across the Internet and delivers data to the database server for recording in one of the associated tables 126–128. The application itself consists of one or more Web pages 134, access tables 130–132, registration table 128, program code 500, and one or more data tables 126. The registration table 128 is accessible via the Web by those users whose role is listed as group manager. The registration table includes group name, user id, password and role. A first of the access tables 130 correlates each web page 134 with the one or more roles in fields 520, 522 respectively. A second access table 132 correlates each table or objects structure in the database with one or more corresponding roles in fields 530–532 respectively. The web page 432*j* discussed above in connection with FIG. 4 contains various static elements 438 as well as dynamic elements. The dynamic elements shown are element 434 which is a function call to the program code 500 to determine the associated role of the requesting user. The role of the user is determined from a session table 504 which is a volatile structure maintained by the web server 400 for avoiding repetitive login by a user as each new page is displayed.

A client web browser and a web server maintain what is called a stateless connection. Each time request is made from a web browser to a web server a temporary connection is establish between the browser and server. The only information maintained by the server is a session identifier which avoids the need for resubmitting username and password with each communication. Other than that the communication is stateless because after each request is satisfied the connection between the Web browser and Web server is dropped. Using the session and registration tables the web server under the direction of program code 500 determines each users role. FIGS. 5A–C show three embodiments for correlating roles with web pages and the dynamic elements they may contain. In FIG. 5A dynamic element 434 results in a function executed by the web server using program code 500 from which the user role is determined from the session information and the information in the registration table. The next dynamic element 440 includes an embedded function, e.g. "If-Then-Else" or "Case" which conditions the generation of the HTML element, e.g. an URL 554 on a specific role, i.e. Atty 552. If the requestors role is Attorney the web browser will generate the element and inject it into the HTML page delivered to the user. Otherwise the element will not be generated, substituting instead a blank space. The web server recognizes the dynamic elements by virtue of characters 550, 570 which identify the string. The access controller 502 contains the program code access tables and registration tables which collectively implement to logic to properly layout and present the page depending on the role of the user. The pages contain varying degrees of information related to the role(s) associated with their dynamic elements.

In the embodiment of the invention shown in FIG. 5B the dynamic elements of the page contain identifiers 542 which correlate the page and the element number in the page with the function 540 requesting the user role. This allows the role information for each page to be stored in the page access table 130 in fields 524 and 526, rather than hard coded onto each page. The function 556, "page 1 element 1" (P1E1) evaluates true if the role of the user in the registration table 128 correlates with the role for the element recorded in the access table 130 as determined by the access control 502 module, including the above mentioned program code 500, access tables 130–132 and registration table 128 discussed above.

In the embodiment shown in FIG. 5C the dynamic elements of the web page include functions 540–542 to get the role and group of the user by correlating the session information for the requesting user with the user information in the registration tables. The function 544 evaluates to true if the role recorded, this time in the access table in fields 520, 522, 524, 526, and 528 corresponds with the role of the requesting user stored in the registration table. This embodiment of the invention if implemented in conjunction with a web page accessible to managers which allows them to input data for their group into access table 130, allows the user with manager role in each group to define new roles for the application.

Figure 6:
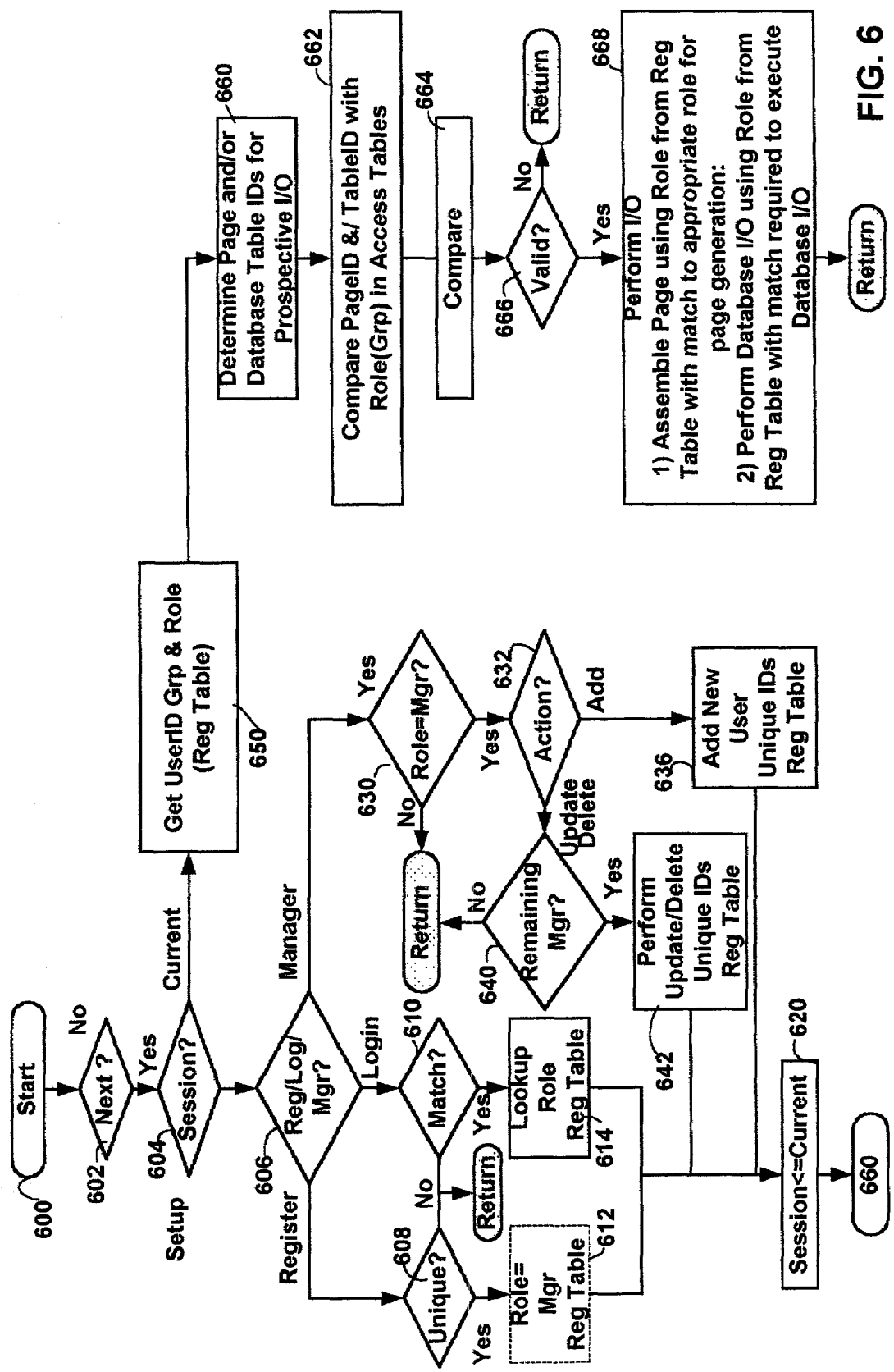
FIG. 6 is a process flow diagram of the processes implemented by the application server shown in FIG. 1 for management of individual and group use of the professional practice application.

FIG. 6 is a process flow diagram of the processes implemented by the web server 400 shown in FIGS. 4–5 for managing the professional practice application. After initialization 600 processing begins in decision block 602 with the detection of a communication from a new, or existing user. Next indecision process 604 a determination is made as to whether a session has been established for that user. In the event the session has not been fully established control passes to decision process 606.

In decision process 606 a determination is made as to whether the registration, management, or login icons have been selected on the login page shown in FIG. 3B. If the registration icon has been selected control passes to decision process 608 to determine if the requested user name and password are unique in the registration table. If they are then control passes to process 612 in which the role of the manager is allocated to the newly registered user along with their user name and password in the registration table. Control then passes to process 620 in which the session is established for that user and password. Control then passes to process 650.

If alternately a determination is made in decision process 606 a determination is made that a login icon has been selected then control asses to decision process 610 to determine if the user name and password combination exists in the registration table. If it does control passes to process 614 in which the user role is looked up in the registration table. Control then passes to process 620 in which the session is established for that user and password. Control then passes to process 650.

If alternately in decision process 606 a determination is made that the icon selected on the login page is the manager icon then control passes to decision process 630. In decision process 630 a determination is made as to the role of the requesting user as recorded in the registration table. If they are listed as manager then control passes to decision process 632 in which they are presented the managerial web page shown in FIG. 3D. Their action is evaluated to determine if it is an update/delete or an add. If their action is an update or delete control is passed to decision process 640. In decision process 640 a determination is made as to whether their action would result in no user with role of manager for their group, in which case the action is denied. Otherwise, control passes to process 642 in which their update is performed subject to tests for uniqueness of the user name and password discussed above. Control then passes to process 620 in which the session is established for that user and password. Control then passes to process 650.

If alternately in decision process 632 they desire to add a user control passes to process 636 in which the user is added subject to tests for uniqueness of the user name and password discussed above. Control then passes to process 620 in which the session is established for that user and password. Control then passes to process 650.

Once a session is established as determined in decision process 604 control passes to process 650 in which the user ID, group ID, and role is determined from the registration table. Control then passes to process 660 in which the nature of the user request, e.g. page request and or database I/O is determined. Next in process 662 the role of the requested page and or data base I/O is determined from the relevant access table(s) 130–132 for the requested page or table. This is then compared in process 664 with the role of the requesting user as recorded in the registration table and determined in process 650 discussed above. If the roles for the requesting user and the requested page/data I/O match then control passes to process 668. In process 668 the relevant assembly of page and/or database I/O is performed subsequent to which control returns to decision process 602.

The invention may be implemented on traditional server architectures. One embodiment of the invention its implemented as a software module which may be executed on a computer system in a conventional manner. Using well-known techniques, the software of this embodiment stored on the data storage medium 124 is loaded into and executed within server 122.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A professional practice application configured for use over a network by users operating professionally in a plurality of groups each including one or more users, and the professional practice application comprising:
a database configured to store records each associated with a corresponding one of the plurality of groups;
web pages for entering corresponding records of each group into said database and the web pages including:
data web pages for viewing and entering data records associated with each groups' professional practice;
at least one group registration web page for entering a registration record of a new group including a group identifier and a user identifier for a user having a role of group manager for the new group;
at least one managerial web page for each group manager to manage registration records for users and roles for each user within the group manager's associated group; and
an access controller configured to limit access to the at least one managerial web page to user's with a role of group manager and to limit the registration records viewed and entered by each group manager via the at least one managerial web page to registration records associated with the corresponding group; and to condition a user's access to selected ones of the data web pages based on a user's role in a group and to limit the data records viewed and entered by each user via the selected ones of the data web pages to data records associated with the corresponding group; whereby a plurality of group managers each determine for their associated group both the users in their group and the data records of the group accessible to each user.

2. The professional practice application of claim 1, wherein the records stored in said database include at least two of the following group of records:
client records for storing client data for the clients associated with each of the plurality of groups;
case records for storing each client's case information for each of the plurality of groups;
time records for storing time entries for time spent on each client's cases for each of the plurality of groups;
cost records for storing cost entries for costs incurred on each client's cases for each of the plurality of groups;
docket records for storing docket entries for each client's cases for each of the plurality of groups; and
rule records for storing each group's rules for populating the corresponding docket records.

3. The professional practice application of claim 1, wherein at least one of said data web pages includes:
a static portion encoded in a markup language;
an interpreted portion encoded in a scripting or embedded language; and
said access controller further configured to conditionally interpret said interpreted portion depending on a correlation between a role associated with said interpreted portion and the role of the user requesting the at least one of said data web pages.

4. The professional practice application of claim 1, wherein said access controller further comprises:
an access table for correlating each of the web pages with at least one corresponding user role.

5. The professional practice application of claim 4, with the at least one managerial web page further allowing each group manager to manage roles associated with access to each of the web pages.

6. The professional practice application of claim 1, wherein said access controller further comprises:
an access table for correlating each of the web pages as well as each table of records of said database with at least one corresponding user role.

7. The professional practice application of claim 6, with the at least one managerial web page further allowing each group manager to manage roles associated with access to each of the plurality of web pages and each table of records of said database.

8. The professional practice application of claim 1, with said access controller further configured to require each group to have at least one user with a role of group manager.

9. The method for implementing a professional practice application configured for use over a network by users operating professionally in a plurality of groups each including one or more users, and the method comprising the acts of:
providing a database configured to store records each associated with a corresponding one of the plurality of groups;
providing web pages for entering corresponding records of each group into said database including: data web pages for viewing and entering data records associated with each groups' professional practice; at least one group registration web page for entering a registration record of a new group including a group identifier and a user identifier for a user having a role of group manager for the new group; at least one managerial web page for each group manager to manage registration records for users and roles for each user within the group manager's associated group;
limiting access to the at least one managerial web page to user's with a role of group manager;
limiting the registration records viewed and entered by each group manager via the at least one managerial web page to registration records associated with the corresponding group;
conditioning a user's access to selected ones of the data web pages based on a user's role in a group; and
limiting the data records viewed and entered by each user via the selected ones of the data web pages to data records associated with the corresponding group; whereby a plurality of group managers each determine for their associated group both the users in their group and the data records of the group accessible to each user.

10. A computer program product for a professional practice application configured for use over a network by users operating professionally in a plurality of groups each including one or more users; and the computer program product having a plurality of instructions embodied in a computer readable medium; wherein said instruction, when executed by a computer, perform the acts of:
providing a database configured to store records each associated with a corresponding one of the plurality of groups;
providing web pages for entering corresponding records of each group into said database including: data web pages for viewing and entering data records associated with each groups' professional practice; at least one group registration web page for entering a registration record of a new group including a group identifier and a user identifier for a user having a role of group manager for the new group; at least one managerial web page for each group manager to manage registration records for users and roles for each user within the group manager's associated group;

limiting access to the at least one managerial web page to user's with a role of group manager;

limiting the registration records viewed and entered by each group manager via the at least one managerial web page to registration records associated with the corresponding group;

conditioning a user's access to selected ones of the data web pages based on a user's role in a group; and limiting the data records viewed and entered by each user via the selected ones of the data web pages to data records associated with the corresponding group; whereby a plurality of group managers each determine for their associated group both the users in their group and the data records of the group accessible to each user.

* * * * *